Dec. 20, 1932.  L. A. TUVIN  1,891,697
FOOD ACCESSORY COMPOUND
Filed July 10, 1931
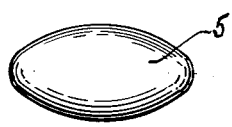
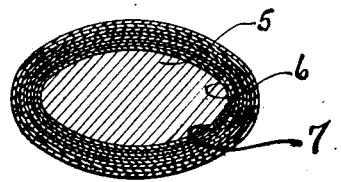
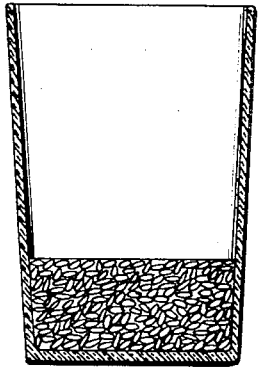
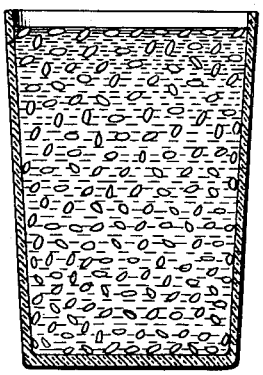
Inventor
Louis A. Tuvin,
By Geo. P. Kimmel
Attorney Patented Dec. 20, 1932

1,891,697

UNITED STATES PATENT OFFICE

LOUIS A. TUVIN, OF NEW YORK, N. Y.

FOOD ACCESSORY COMPOUND

Application filed July 10, 1931. Serial No. 549,977.

This invention relates to a food accessory compound having a medicinal or remedial action on the intestinal tract.

It is well known that pysllium seed taken alone into the system is beneficial in the treatment of constipation in that it furnishes bulk, roughage and lubrication provided, however, that the individual taking the same into his system will always remember to drink large quantities of water or other liquids and give to the seed plenty of time to absorb the moisture thus provided and thus expand to form the bulk and roughage as well as to permit the mucilaginous and oily content of the seed to become distributed throughout the intestinal tract and thus perform the function for which psyllium seed is taken.

To more fully define the objections to taking psyllium seed alone it may here be explained that this seed owes its properties to a high yield of mucilaginous exudate which the seed gives out when placed in contact with water or other liquids. The seed absorbs a volume of moisture many times the volume of the seed itself. As heretofore explained the constant absorption of moisture by the seed while it is in the intestinal tract is absolutely necessary. If a lack of moisture exists, then a dangerous condition may result from impaction of the bowels or the formation of bezoars, which may easily bring on serious complications. In cases of spastic constipation psyllium seed alone with its roughage content cast as a positive irritant.

One of the principal objects of my invention is to overcome the defects as above outlined with respect to the use of psyllium seed alone. Its aim is to permit of the use of this most potent and desirable product in a safe and far more efficient manner than has heretofore been possible. A further object is to permit of the use of psyllium seed and at the same time eliminate entirely the danger of one taking this seed into the system and failing to at the same time furnish sufficient moisture so that the results sought by its use will be accomplished without injurious effect.

Another object of my invention is to so treat psyllium seed that it will not only have a more appetizing appearance, but will also have a more appetizing taste than can be said for psyllium seed alone. Furthermore the ingredients used to accomplish the foregoing results are substances having great and rapid absorptive qualities so that the fluid customarily taken into the system at the time of taking my compound into the system will almost immediately be absorbed so that there will always be a sufficient amount of moisture to cause the seed itself to perform its function without any danger of impaction or the formation of bezoars. In fact if my compound be taken without liquid the salivary fluid of the mouth will be sufficient to cause it to function properly. In other words the psyllium seed is encased in a highly absorbent compound which, when moist, produces a jelly-like, soft mass thereby providing a moist bed for the fullest development of the beneficient qualities of psyllium seed.

Because of the naturally smooth and oily surface of psyllium seed in its natural state and its tendency to swell upon coming in contact with moisture, it has heretofore been considered impossible to so treat it that the substances necessary to bring about the proper results would adhere to the seed. I have however discovered that by applying alternate layers of sugar coating and gum coating in a manner hereinafter described, I am able thus to build up out of each extremely small psyllium seed a granule from three to five times the normal size of the seed alone. The coatings thus applied not only adhere to the seed, but also provide for rapid disintegration of the mass; rapid absorption of moisture by the mass, thus forming in the shortest possible space of time, a soft, limpid, coherent, gelatinous mass a hundred times or more in volume the volume of the original material. Since each seed thus has a moist gelatinous mass surrounding it (Fig. 4) to assure to the seed itself the moisture required to make it expand and exude its gelatinous and oily content, the seed itself never has the opportunity to congregate into a mass of seed but remains distributed in the entire gelatinous mass formed by the dose taken at one time by the user. In this state the compound is in the most desirable form to accomplish its function of combining the waste products of the intestines and colon into a coherent mass, which is thus well lubricated and greatly enlarged in bulk, creating a natural stimulant to the peristaltic action and eases elimination of the system.

It should here be explained that this product is not a medicine in the sense in which that term is generally understood. Neither is it a food, since it has small nutritive value. Its functioning in the intestinal tract is purely mechanical. The compound forms an inert mass in the system and passes through the intestinal tract undisturbed by the digestive processes. Hence it is especially valuable in forming great bulk within the intestinal tract, so necessary to promote peristaltic action, but also in providing the bulk with adequate moisture.

The use of psyllium seed has become so popular that it has become quite expensive. Furthermore, when psyllium seed is used alone the dosage is generally two teaspoonfuls. By using my compound one teaspoonful is an ample dosage for an adult. In fact this amount of my compound is more effective than two teaspoonfuls of psyllium seed alone. In one teaspoonful of my compound there is not much more than one-quarter to one-third teaspoonful of psyllium seed. Yet the resultant gelatinous mass and bulk produced by my compound is from 7 to 10 times the size produced by the psyllium seed alone. The tremendous saving in the use of expensive psyllium seed is immediately apparent so that there is not only a decided reduction in the cost of the product but a more effective use of such of the psyllium seed as is actually employed.

It should here be explained that the term psyllium seed used herein, is used in its generic sense as describing the generally recognized term for the various species. Technically speaking psyllium seed belongs to the plantago family, known as *Plantago psyllium*. There are also other specific kinds of psyllium seed, such as *Plantago ovata* and *Plantagolanceolota*. While *Plantago psyllium* as grown principally in France and Spain is recognized as the finest quality and most desirable, still my invention contemplates the use of not only any of the various species of psyllium seed, but also any other seeds which may have the peculiar characteristics of psyllium seed, though possibly identified by some other name.

The invention will be best understood from a consideration of the following detailed description taken in connection with the accompanying drawing, forming a part of this specification with the understanding that the invention is not strictly confined to the showing of the drawing but the articles may be changed and modified in shape so long as such modifications mark no material departure from the salient features of the invention as expressed in the appended claim.

In the drawing:

Figure 1 shows an elevation of a psyllium seed.

Figure 2 shows a sectional view of a psyllium seed after the same has been processed as hereinafter described.

Figure 3 illustrates a tumbler in section with water and the customary dose of psyllium seed alone, showing relative expansion when thus used.

Figure 4 illustrates a tumbler in section showing the usual dose of my compound after it has been immersed in water, the space between the seeds indicating a gelatinous mass through which the seeds are distributed.

The compound embodying this invention has the following composition:

Psyllium seed, approximately 25%,
India gum, approximately 30%,
Cane sugar, approximately 45%.

It should be understood in lieu of cane sugar I may use either saccharin, lactose, or the like. Also that where a laxative effect is desired by the user, I may incorporate into the coating such medicines as phenolphthalein, podophyllin, cascara or the like.

The manner and order of preparing the above set forth ingredients is as follows:

The psyllium seed is carefully sifted and cleaned so that all extraneous matter such as chaff, grit, sand, dirt and shell are removed.

The gum is granulated and powdered and sifted through a 60 to 70 mesh screen.

The cane sugar or its equivalent is dissolved, preferably by heating in a steam jacketed copper kettle at a temperature sufficient to produce a thick but easy-flowing syrup.

The psyllium seed 5 is then placed within a revolving steam jacketed panning machine having a temperature of approximately 120° Fahrenheit. As the panning machine revolves the hot liquid sugar is gradually sprayed onto the seed therein, thus causing an even distribution of the first coating of sugar 6 on the seed. Before the sugar coating thus applied is completely dried, a quantity of the pulverized gum is sprayed into the panning machine and onto the sugar coated psyllium seed therein, thus forming a coating 7 of gum about the coating 6 of sugar syrup. A characteristic of the gum used is that it has a greater affinity for moisture than the seed. Immediately upon the application of the gum to the moist sugar coating, the gum tends to attract the moisture in the sugar coating away from the seed. This action of the gum thus cooperates with the heat to dry the coatings so rapidly that swelling or exudation of the seed does not have time to occur. In other words, the gum is hygroscopic to a greater degree than is the seed, or in any event its capillary attraction is greater so that the drying process of the first coating of liquid sugar and the first coating of powdered gum will take place by a drawing of the moisture outwardly and away from the seed before it can have any effect in destroying the natural characteristics of the seed embedded within the coatings. All the time the machine is being revolved so that the contents are constantly agitated and not permitted to cake. Furthermore the constant agitation of the panning machine heated to the temperature above indicated tends to gradually dry the various coatings of sugar and gum alternately applied to the seed until the granules thus formed have been built up to the proper size, and have substantially the proportions of the various ingredients as previously described. Continuing the carrying out of the process, a second coating or layer of sugar is applied over the first coating of gum, and then a second coating of gum is applied over the second coating of sugar. This is continued until preferably four coatings alternately of sugar and gum have been applied to the psyllium seed which forms the center of each granule, as illustrated in Figure 2 of the drawing. I prefer that the last coating be sugar, but this is not absolutely necessary. The advantage of having the last coating sugar is simply that sugar in the mouth immediately starts activity of the salivary glands when the compound is taken without other liquids.

After the last coating as previously described has been applied to the mass rotating within the panning machine, the rotation thereof is continued for approximately thirty minutes or until the coatings have become hardened throughout. The contents of the machine is then passed over sieves whereby it is freed from all loose sugar and gum particles.

While the final coating determines the precise color of the finished product, it may be found desirable to add coloring matter to the sugar to give to the finished article a different color from the substantially white color that it has when granulated sugar syrup is used as the final coating. The addition of such coloring matter may be carried out without departing from my invention.

While the percentages of the compound may be varied as desired without departing from the scope of my invention, I have found that the percentages herein set forth seem to give the best general results.

Aside from the dangers and added expense of taking raw psyllium seed, there is also a tendency of this seed to become lodged in crevices of the teeth. All of this is overcome by the use of my compound, which is not only easily taken into the system either in its finished state or by adding to other foods, such as cereals and the like, but also has the advantages heretofore described by combining a gum in such manner as to serve a double function. This is the only method known whereby moisture may be introduced into the colon of the system in connection with the use of psyllium seed.

Although the commonly known designation of the variety of seed which possesses the characteristics desirable for use in this invention is "psyllium", it should be understood that although the claim cannot properly be worded in the alternative, it is intended to include as a part of my invention the various varieties of commonly known psyllium seed which may be more accurately identified in a botanical sense as "*Plantago psyllium*", "*Plantago ovata*", and "*Plantago lanceolata*".

What I claim is:—

A food accessory compound of the character described, comprising a psyllium seed; a coating of sugar applied to said psyllium seed, and a coating of gum capable of absorbing moisture applied to said coating of sugar.

In testimony whereof I affix my signature hereto.

LOUIS A. TUVIN.